(12) United States Patent
Bülow

(10) Patent No.: US 7,295,774 B2
(45) Date of Patent: Nov. 13, 2007

(54) PERFORMANCE MONITORING FOR OPTICAL LINKS

(75) Inventor: Henning Bülow, Kornwestheim (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 11/302,259

(22) Filed: Dec. 14, 2005

(65) Prior Publication Data

US 2006/0177220 A1    Aug. 10, 2006

(30) Foreign Application Priority Data

Feb. 4, 2005    (EP)    ................... 05290259

(51) Int. Cl.
*H04B 10/08*    (2006.01)
*H04B 10/00*    (2006.01)

(52) U.S. Cl. .................. 398/25; 398/33; 398/158

(58) Field of Classification Search ........... 398/25–28, 398/33, 34, 158
See application file for complete search history.

(56) References Cited

U.S. PATENT DOCUMENTS

| 6,600,794 | B1 | 7/2003 | Agarossi et al. | |
| 6,707,850 | B1 | 3/2004 | Blake et al. | |
| 6,781,938 | B2* | 8/2004 | Nanba et al. | 369/59.22 |
| 2002/0191257 | A1* | 12/2002 | Bessios | 359/161 |

FOREIGN PATENT DOCUMENTS

| EP | 1 422 845 A2 | 5/2004 |
| EP | 1 494 413 A1 | 1/2005 |
| WO | WO 2004/034611 A1 | 4/2004 |

OTHER PUBLICATIONS

Agazzi: "Maximum likelihood sequence estimation in the presence of chromatic and polarization mode dispersion in intensity modulation/direct detection optical channels" IEEE International Conference on Communications, vol. 5, Jun. 20, 2004, pp. 2787-2739, XP010709741.

(Continued)

*Primary Examiner*—Dalzid Singh

(57) ABSTRACT

A method for estimating at least one optical link parameter using a Viterbi equalizer (1) generating averaged values (M) of signal amplitudes of a distorted optical signal transmitted through an optical link (2) for a set of decided bit patterns (a, b, c, d, . . . ), the method comprising the following steps: forming a first parameter set (S) characteristic of a distorted signal sequence using the averaged values (M(a), M(b), M(d), M(g)) for a given sequence (abdg) of bit patterns (a, b, c, d, . . . ), comparing the first parameter set (S) to a plurality of reference parameter sets (R1, R2, . . . ) characteristic for reference signal sequences of the same sequence (abdg) of bit patterns (a, b, c, d, . . . ), each of the reference parameter sets (R1, R2, . . . ) having a known value of the at least one optical link parameter, and selecting the reference parameter set (R) with the closest correlation to the first parameter set (S), the known value of the at least one optical link parameter of the selected reference parameter set (R) being used as an estimate for the at least one optical link parameter. A computer program product comprising a software or a hardware implementing the method.

9 Claims, 1 Drawing Sheet

OTHER PUBLICATIONS

Wrage, Spinnler: "Distortion identification in WDM networks by analysis of electrical equalizer coefficients" European Conference on Optical Communication, vol. 4, 2004, pp. 824-825, vol. 4, Kista, SE.

Agazzi: "Maximum-likelihood sequence estimation in dispersive optical channels" IEEE Journal of Lightwave Technology, vol. 23, No. 2, Feb. 2005, pp. 749-763, XP002338784.

* cited by examiner

PERFORMANCE MONITORING FOR OPTICAL LINKS

The invention is based on a priority application EP 05290259.0 which is hereby incorporated by reference.

FIELD OF THE INVENTION

The invention relates to a method for estimating at least one optical link parameter.

BACKGROUND OF THE INVENTION

For performance monitoring of 10 Gb/s (future 40 Gb/s) transmission systems, it is mandatory to obtain a reliable estimate of the status of optical transmission links for preemptive fault detection for network management or network control. This status can be described by optical link parameters being characteristic of the distortion of an optical signal transmitted through the optical fiber link, such as chromatic dispersion (CD), polarization mode dispersion (PMD), self-phase modulation (SPM), etc.

There have been proposed many costly solutions for performance monitoring of optical links, including optical measurement techniques as well as techniques which use additional modulation tones (not in the standard). At the ECOC 2004, M. Wrage and B. Spinnler have proposed a method of distortion identification by analyzing equalizer coefficients (FFE tap settings) of a finite impulse response (FIR) equalizer in the paper "Distortion Identification in WDM Networks by Analysis of Electrical Equalizer Coefficients". The solution proposed in this paper is based on the equaliser setting of a FFE, which is used for all signal bit patterns. Due to the limited parameter set (taps) it works only for a limited dispersion range or fails if mixed distortions are present (e.g. PMD and CD).

OBJECT OF THE INVENTION

It is the object of the invention to obtain a reliable estimate of the status of an optical transmission link by determining estimates of optical link parameters being characteristic for distortion induced in the optical link.

SHORT DESCRIPTION OF THE INVENTION

This object is achieved by a method for estimating at least one optical link parameter using a Viterbi equalizer generating averaged values of signal amplitudes of a distorted optical signal transmitted through an optical link for a set of decided bit patterns, the method comprising the following steps: (a) forming a first parameter set characteristic of a distorted signal sequence using the averaged values for a given sequence of bit patterns, (b) comparing the first parameter set to a plurality of reference parameter sets characteristic for reference signal sequences of the same sequence of bit patterns, each of the reference parameter sets having a known value of the at least one optical link parameter, and (c) selecting the reference parameter set with the closest correlation to the first parameter set, the known value of the at least one optical link parameter of the selected reference parameter set being used as an estimate for the at least one optical link parameter.

The inventive method uses a Viterbi equalizer which already sorts the received signal (samples of it) according to the bit pattern. Each bit pattern consists of a sequence of subsequent decided bits being correlated by inter-symbol interference (ISI), the ISI being characteristic for the distortion of the optical link. Therefore, much more parameters as in the state of the art can be used to quantify and identify different distortions (=dispersions).

For a given sequence of bit patterns, a first parameter set consisting of a sequence of averaged values characteristic for the unknown optical link parameter (distortion) is generated. This parameter set is compared to reference parameter sets consisting each of a sequence of averaged values with a known value of the optical link parameter. The reference sequence having the parameter set which is closest to the first parameter set is chosen as an estimate for the optical link parameter. It is evident that the precision with which the optical link parameter is estimated depends on the number of reference parameter sets used. If two reference parameter sets have about the same (closest) correlation to the first parameter set, the estimate of the optical link parameter is accomplished by interpolating between the known values of the two reference parameter sets.

In a preferred variant, the averaged values of the signal amplitudes are derived from histograms of signal amplitudes generated by the Viterbi equalizer. For enabling the decisions of Viterbi equalizers (channel modeling) and avoiding erroneous decisions it is well-known to use a monitoring device generating statistical data about the signal transmitted through the optical link. In such a device, a histogram of a probability distribution of signal amplitudes of an optical signal transmitted through the optical fiber link is generated. Each peak of the probability distribution, which is about equal to the mean value, is characteristic for the received signal amplitude belonging to one of the bit patterns. It might be appropriate to characterize a bit pattern by a signal amplitude at or close to the temporal center position of the bit pattern.

In a further preferred variant, steps (a) to (c) are carried through for a second parameter set using further statistical data about the signal amplitudes derived from the histograms. The histograms may serve to determine more statistical data than just the mean value for each bit pattern.

In a further variant, the further statistical data comprises the variance of the signal amplitudes. The mean value of the signal amplitude may be used in conjunction with the variance of the signal amplitude for determining certain optical link parameters such as the optical signal to noise ratio (OSNR).

In a preferred variant, the comparison in step (c) is carried through by a maximum likelihood estimation, in particular by calculating a minimum square error. In this way, an easy comparison of the reference parameter sets with the first parameter set is provided.

In a highly preferred variant, the at least one optical link parameter is selected from the group consisting of chromatic dispersion (CD), polarization mode dispersion (PMD), self-phase modulation (SPM), and optical signal to noise ratio (OSNR). These (and other) properties of the optical fiber link may be advantageously determined by the inventive method.

In a further variant, step (a) is preceded by a reference parameter set generating step, generating a reference value for each bit pattern and for each reference parameter set. The reference value may be the averaged value, the variance, etc. of the signal amplitude.

In a highly preferred variant, the given sequence of bit patterns is derived from a sequence of transmitted bits. In this way, an on-line determination of optical link parameters for a transmitted signal is possible.

In yet another variant, three subsequent decided bits are used to form a bit pattern. The three subsequent bits are correlated through inter-symbol interference (ISI), i.e. the transmitted bit in the center of the three subsequent bits is influenced by the bit transmitted directly before and the bit transmitted directly after the bit in the center. The ISI is due to signal distortion.

The invention is also realized in a computer program product comprising a software or a hardware implementing the method as described above. The computer program product may be implemented as a hardware in a DSP-ASIC or as a software in a processor reading the histogram data of the Viterbi-ASICs. The dispersion values may then be made available to the network management or the control plane of the optical network.

Further advantages can be extracted from the description and the enclosed drawing. The features mentioned above and below can be used in accordance with the invention either individually or collectively in any combination. The embodiments mentioned are not to be understood as an exhaustive enumeration but rather have exemplary character for the description of the invention.

DETAILED DESCRIPTION OF THE INVENTION

Figure 1:
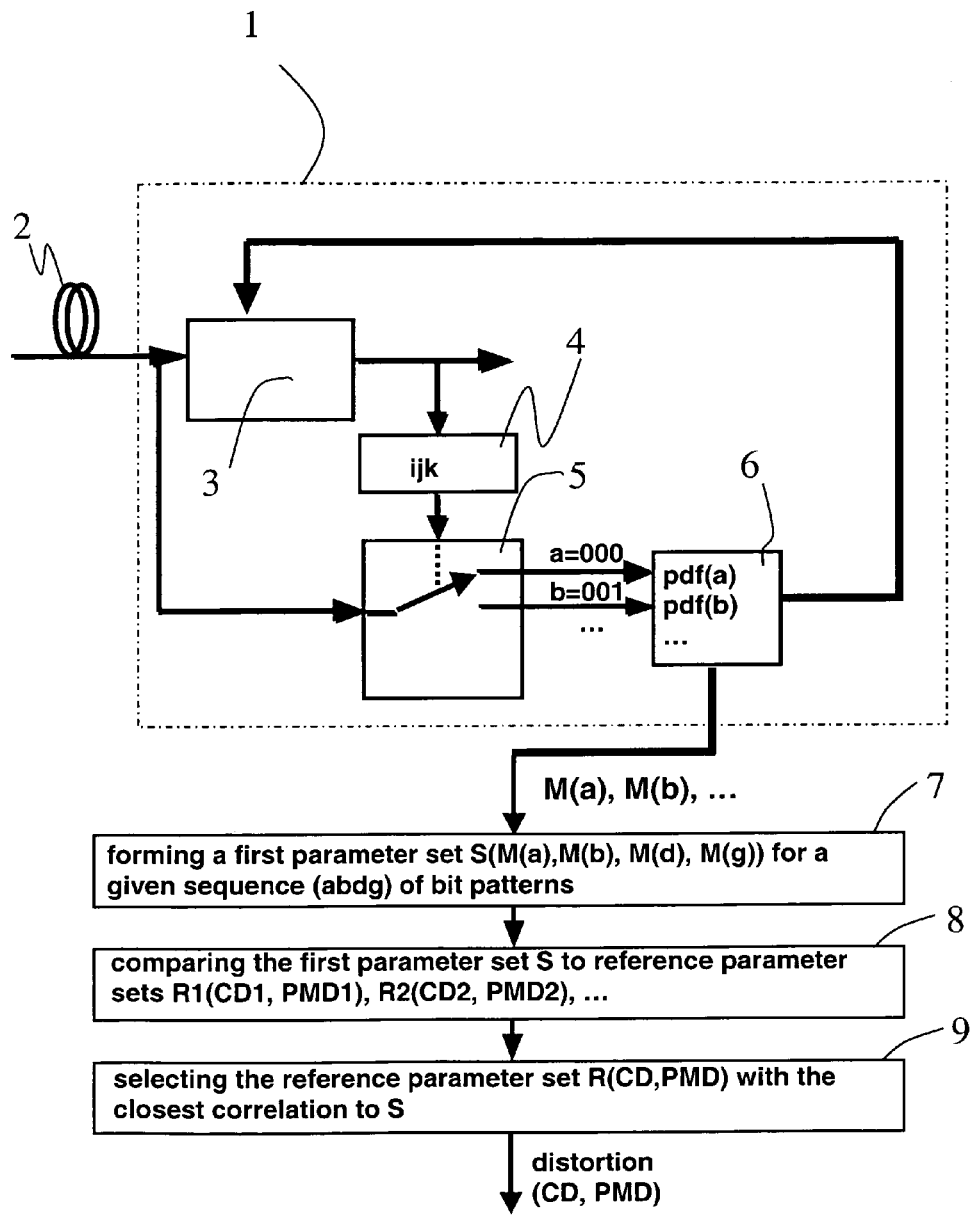
FIG. 1 shows a Viterbi equalizer used for implementation of the inventive method and a flow-chart of the inventive method.

The technique explained below is based on the existence of a Viterbi equalizer 1 as shown in FIG. 1. The Viterbi equalizer 1 (maximum-likelihood sequence detector) may be implemented in the receiver line card of an optical receiver (not shown). For its adaptation, the Viterbi equalizer 1 extracts detailed information on the distortion of an optical signal transmitted through an optical link 2, the optical signal being converted to an analog electrical signal by a photodiode (not shown) at the entrance of the Viterbi equalizer 1. The analog electrical signal is converted to a digital bit sequence in a Viterbi core 3.

Depending on the subsequent bits appearing at the output of the Viterbi core 3, a shift register 4 distributes the input to the Viterbi core 3 to one of the output channels of a multiplexer 5. The outputs are fed into a histogram generator 6. Commonly the signal at the input of the multiplexer 5 is analog-to-digital converted (not shown in the FIGURE) and the histogram generator 6 comprises digital registers. However, it is also possible to use an analog multiplexer as an alternative solution. The process described above will be explained in greater detail below:

The shift register 4 contains a first, second and third bit ijk and is connected to the output of the Viterbi core 3. The second bit j is the decided bit for a given sampling time (t), the first bit i is the decided bit at a previous sampling time (t−1), and the third bit k is the decided bit at a subsequent sampling time (t+1). The contents of the shift register 4 are shifted to the left after each time step.

The reason why three bits ijk are registered in the shift register 4 is that the correlation length of the inter-symbol interference (ISI) is one bit, i.e. only the subsequent, third bit k and the previous, first bit i have an influence on the analog value of the optical signal measured for the second bit j. There are eight possible states of the shift register 4, each one defining a bit pattern. The first bit pattern a is identified with the three-bit state ijk=000, the second bit pattern b is identified with the three-bit state ijk=001, etc.

The shift register 4 is connected to the multiplexer 5 whose input is connected to the input of the Viterbi core 3. The analog value of the signal at the input of the Viterbi Core 3 is therefore delivered as an input to the multiplexer 5 which selects one out of its eight possible output channels in dependence of the state of the shift register 4. Thus, the analog values for each of the eight decided bit patterns are delivered in separate channels to the histogram generator 6.

The histogram generator 6 uses the analog values or the digitized analog values measured for each of the bit patterns at the entrance to the Viterbi core 3 to generate a probability density function pdf(a), pdf(b) etc. for each of the bit patterns (channel model). An output of the histogram generator 6 is used as a feedback signal to the Viterbi core 3, adapting the branch metric unit in dependence of the statistical data generated in the histogram generator 6. From the probability density functions pdf(a), pdf(b), . . . the mean values M(a), M(b), . . . of signal amplitudes of the analog signal can be derived for each bit pattern a, b, etc. The mean values M(a), M(b), . . . measured in FIG. 1 are obtained from statistics about the analog value of the signal at the input to the Viterbi Core 3 at the sampling time of the second bit j.

It is practical to evaluate the signal amplitude only at the sampling time of the actual transmitted bit j. However, it is also possible to determine the value of the signal amplitude over a short time interval before and after the decision time of the second bit j, the time interval being much shorter than the overall duration of the three-bit sequence ijk. The time average over this short time interval may be taken in the histogram generator 6 before the statistical evaluation is carried through.

The statistical information about the optical signal in the histogram generator 6 is dependent on the distortion of the optical link 2, as the ISI is distortion-dependent. Consequently, the data being present in the histogram generator 6 can be used to calculate optical link parameters such as chromatic dispersion (CD), polarization mode dispersion (PMD) etc., with the method described below.

For this method to work, it is necessary that the averaged values M(a), M(b) etc. for each of the eight bit patterns are determined in the Viterbi equalizer 1. These values being known, a sequence of bit patterns, e.g. abdf, is defined in a first step 7 of the method and a sequence of mean values M(a), M(b), M(d), M(g) is generated from this sequence, so that a first parameter set S(M(a), M(b), M(d), M(g)) is formed.

In a second step 8, the first parameter set S is compared to a plurality of reference parameter sets R. The reference parameter sets R consist of a sequence of averaged values of the analog signal with known values of the distortion parameters to be estimated, in the present case CD and PMD. The first/second reference parameter set R1/R2 corresponds to a first/second value CD1/CD2 of chromatic dispersion and a first/second value PMD1/PMD2 of polarization modulation dispersion. Of course, it is possible for the reference parameter sets R to differ only in one optical link parameter, such that in the above case, the values of polarization mode dispersion are equal for all of the reference sequences R whereas the CD values are not.

In a third step 9, the reference sequence with the closest correlation to the first parameter set S is chosen. The correlation is defined in the sense of a maximum-likelihood correlation, being evaluated e.g. by calculating the minimum square error between the parameter set S and the parameter sets R, i.e. $\min(S-R)^2$. The reference parameter set with the closest correlation to the first parameter set S is determined and the corresponding distortion values CD, PMD define the estimated link parameters for chromatic dispersion and polarization mode dispersion, respectively.

Because of the use of averaged values a noise-free (but still distorted) analog sequence is reproduced. This analog sequence may or may not have been transmitted through the optical link 2. It is sufficient that the sequence of bit patterns is significant for the analog signal. However, the sequence of bit patterns it is chosen preferably in such a way that it has a significance for the transmitted signal. Especially, it is possible to derive the sequence of bit patterns from a sequence of decided bits transmitted through the optical link 2, as is described below.

As an example for the connection between bit sequences and bit patterns, it is supposed that for a given time step a bit sequence consisting of three subsequent bits a=000 corresponding to the first bit pattern a is present in the shift register 4. In the following time step, a new decided bit "1" is present at the output of the Viterbi core 3. Consequently, the shift register and adopts the state ijk=001 corresponding to the second bit pattern b. In the following time step, a new decided bit "1" is present at the output of the Viterbi core 3, leading to a state ijk=011 of the shift register 4, corresponding to the fourth bit pattern d. If the decided bit of the subsequent time step is "0", the state of the shift register 4 is ijk=110, corresponding to the seventh bit pattern g.

In this way, the sequence of decided bits transmitted through the optical fiber link 2 consisting of six subsequent bits 000110 gives rise to the sequence of four bit patterns abdg. It is thus possible to carry through the three steps 7, 8, and 9 with a sequence of bit patterns being derived from the sequence of transmitted bits. The length of the sequence of bit patterns may be chosen to be four, as above, though it is also possible to use a sequence consisting of more or less bit patterns.

The method described above may be easily modified by using additional statistical data from the histogram generator 6, e.g. the variance of the amplitudes of the bit patterns a, b, etc. Thus, a second, third etc. parameter set can be generated for each sequence of bit patterns. The correlation of these parameter sets and the reference parameter sets for these additional parameters can be calculated as described above. As a result, optical link parameters with greater accuracy can be obtained. In this way, it is also possible to estimate the signal-to-noise ratio. The variances, which can be extracted from the different histograms, are directly linked to the optical signal to noise ratio (OSNR). The lower the OSNR, the more noise and the bigger are the variances. The OSNR values can be determined by comparing the histogram variances with the variances of reference patterns R with a known OSNR, or can directly be calculated from the histograms using theoretical approaches.

The reference parameter sets R can be obtained before the first step 7 by generating a look-up table in which an averaged value of the analog signal is stored for each value of the at least one optical link parameter and for each bit pattern. These averaged values have either been measured or obtained by numerical simulation for each distortion parameter separately or for mixed distortions (i.e. CD and PMD). It is also possible that the reference parameter sets are calculated on-line in a processor while performing the method as described above. The method described above may be implemented as hardware or software as part of a Viterbi equalizer control.

In summary, when a Viterbi equalizer is present in an optical receiver, the above method for the determination of distortion parameters can be easily implemented almost without additional cost as a software in the Viterbi equalizer. As Viterbi equalizers generally adapt themselves to the incoming signals in the range of milliseconds, a millisecond speed for performance monitoring of optical links can be reached. Furthermore, the method described above uses more parameters than the state of the art and consequently has the potential to be more precise.

The invention claimed is:

1. A method for estimating at least one optical link parameter using a Viterbi equalizer generating histograms of signal amplitudes of a distorted optical signal transmitted through an optical link for a set of decided bit patterns, the method comprising the following steps:
    (a) forming a first parameter set characteristic of a distorted signal sequence using averaged values of signal amplitudes derived from the histograms for a given sequence of bit patterns;
    (b) comparing the first parameter set to a plurality of reference parameter sets characteristic for reference signal sequences of the given sequence of bit patterns, each of the reference parameter sets having a known value of the at least one optical link parameter; and
    (c) selecting the reference parameter set with a closest correlation to the first parameter set, the known value of the at least one optical link parameter of the selected reference parameter set being used as an estimate for the at least one optical link parameter.

2. The method according to claim 1, wherein steps are carried through for a second parameter set using further statistical data about the signal amplitudes derived from the histograms.

3. The method according to claim 2, wherein the further statistical data comprises a variance of the signal amplitudes.

4. The method according to claim 1, wherein the comparing in is carried though by a maximum likelihood estimation, in particular by calculating a minimum square error.

5. The method according to claim 1, wherein the at least one optical link parameter is selected from the group consisting of chromatic dispersion, polarization mode dispersion, self-phase modulation, and optical signal to noise ratio.

6. The method according to claim 1, wherein forming a first parameter set characteristic is preceded by a reference parameter set generating step, generating a reference value for each bit pattern and for each reference parameter set.

7. The method according to claim 1, wherein the sequence of bit patterns is derived from a sequence of transmitted bits.

8. The method according to claim 1, wherein three subsequent bits are used to form a bit pattern.

9. A computer readable recording medium having embodied thereon a computer program for estimating at least one optical link parameter using a Viterbi equalizer generating histograms of signal amplitudes of a distorted optical signal transmitted through an optical link for a set of decided bit patterns, which is programmed to perform, when executed on a computer, comprising the following steps:
    (a) forming a first parameter set characteristic of a distorted signal sequence using averaged values of signal amplitudes derived from the histograms for a given sequence of bit patterns;
    (b) comparing the first parameter set to a plurality of reference parameter sets characteristic for reference signal sequences of the given sequence of bit patterns, each of the reference parameter sets having a known value of the at least one optical link parameter; and
    selecting the reference parameter set with a closest correlation to the first parameter set, the known value of the at least one optical link parameter of the selected reference parameter set being used as an estimate for the at least one optical link parameter.

* * * * *